United States Patent
Nigul

(10) Patent No.: US 8,972,926 B2
(45) Date of Patent: Mar. 3, 2015

(54) PEER-TO-PEER SHARING IN INTEGRATED DEVELOPMENT ENVIRONMENT

(75) Inventor: Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/874,387

(22) Filed: Sep. 2, 2010

(65) Prior Publication Data
US 2012/0060143 A1   Mar. 8, 2012

(51) Int. Cl.
| | |
|---|---|
| G06F 9/44 | (2006.01) |
| G06F 21/51 | (2013.01) |
| H04L 29/06 | (2006.01) |
| H04L 29/08 | (2006.01) |

(52) U.S. Cl.
CPC ... *G06F 8/00* (2013.01); *G06F 8/20* (2013.01); *G06F 21/51* (2013.01); *H04L 67/104* (2013.01); *H04L 63/102* (2013.01); *G06F 2221/2145* (2013.01); *G06F 2221/2141* (2013.01)
USPC .......................................................... 717/103

(58) Field of Classification Search
CPC ........................................................ G06F 8/20
USPC .......................................................... 717/103
See application file for complete search history.

(56) References Cited

U.S. PATENT DOCUMENTS

| | | | |
|---|---|---|---|
| 7,577,939 B2 | 8/2009 | Bayardo, Jr. et al. | |
| 2004/0039829 A1* | 2/2004 | Bucher ........................ | 709/229 |
| 2008/0134298 A1* | 6/2008 | Nathan et al. ..................... | 726/4 |
| 2008/0178154 A1 | 7/2008 | Basler et al. | |
| 2008/0244418 A1 | 10/2008 | Manolescu et al. | |
| 2009/0094572 A1* | 4/2009 | Hegde et al. .................. | 717/101 |

OTHER PUBLICATIONS

Toporov, Eugene; "Synchronizing IntelliJ IDEA Settings using IDEA Server"; jetbrains.com website; Mar. 19, 2009.*

* cited by examiner

*Primary Examiner* — Qing Chen
*Assistant Examiner* — Clint A Thatcher
(74) *Attorney, Agent, or Firm* — Yee & Associates, P.C.; Parashos T. Kalaitzis

(57) ABSTRACT

The illustrative embodiments herein provide a computer implemented method for verifying code within an integrated development environment. A first data processing system identifies a code dependency within a first artifact located thereon. The code dependency depends on the second artifact located at the separate node of peer-to-peer network. Responsive to identifying the dependency within the first artifact, the first data processing system identifies a second data processing system within a peer-to-peer network that contains the second artifact. The first data processing system requests permission from the second data processing system to access the second artifact. Responsive to receiving permission to access the second artifact, the first data processing system accesses the second artifact on the second data processing system. The first data processing system then verifies a compatibility of the second artifact with the code dependency within the first artifact.

24 Claims, 6 Drawing Sheets

PEER-TO-PEER SHARING IN INTEGRATED DEVELOPMENT ENVIRONMENT

BACKGROUND

1. Field

The disclosure relates generally to a computer implemented method, a computer program product, and a data processing system. More specifically, the disclosure relates to a computer implemented method, a computer program product, and a data processing system for peer-to-peer sharing in an integrated development environment.

2. Description of the Related Art

Software development is becoming increasingly complex and sophisticated. In addition, as computers and embedded controllers are increasingly used in products that were traditionally not computer-based, software development has become an important task for new types of products and new types of manufacturers. For example, in the automotive and electronics industries, software is quickly becoming a major piece of the overall deliverable products. Moreover, the increasing complexity and integration into other products has required greater collaboration between parties, e.g., original equipment manufacturers (OEM's) and suppliers.

Typically, OEM's and suppliers each have their own unique software development environments that are used to develop, test and track problems with deliverable software. In many cases, some of these parties are not particularly well equipped to handle software development, particularly if such parties predominantly provide manufacturing or design of products where software is only a small part of the overall design.

In many situations, it is desirable to allow multiple parties working on a common project to share information between their respective software development environments.

SUMMARY

According to one embodiment of the present invention, a computer implemented method verifies code within an integrated development environment. A first data processing system identifies a code dependency within a first artifact located thereon. The code dependency depends on the second artifact. Responsive to identifying the dependency within the first artifact, the first data processing system identifies a second data processing system within a network that contains the second artifact. The first data processing system requests permission from the second data processing system to access the second artifact. Responsive to receiving permission to access the second artifact, the first data processing system accesses the second artifact on the second data processing system. The first data processing system then verifies a compatibility of the second artifact with the code dependency within the first artifact.

DETAILED DESCRIPTION

Figure 1:
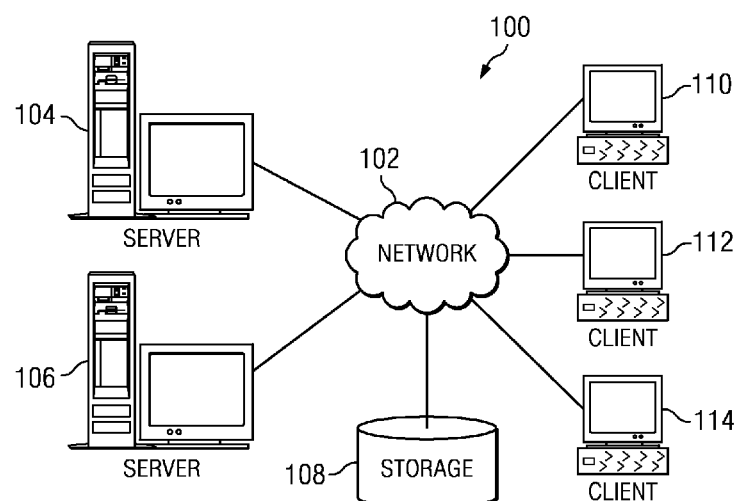
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 are only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
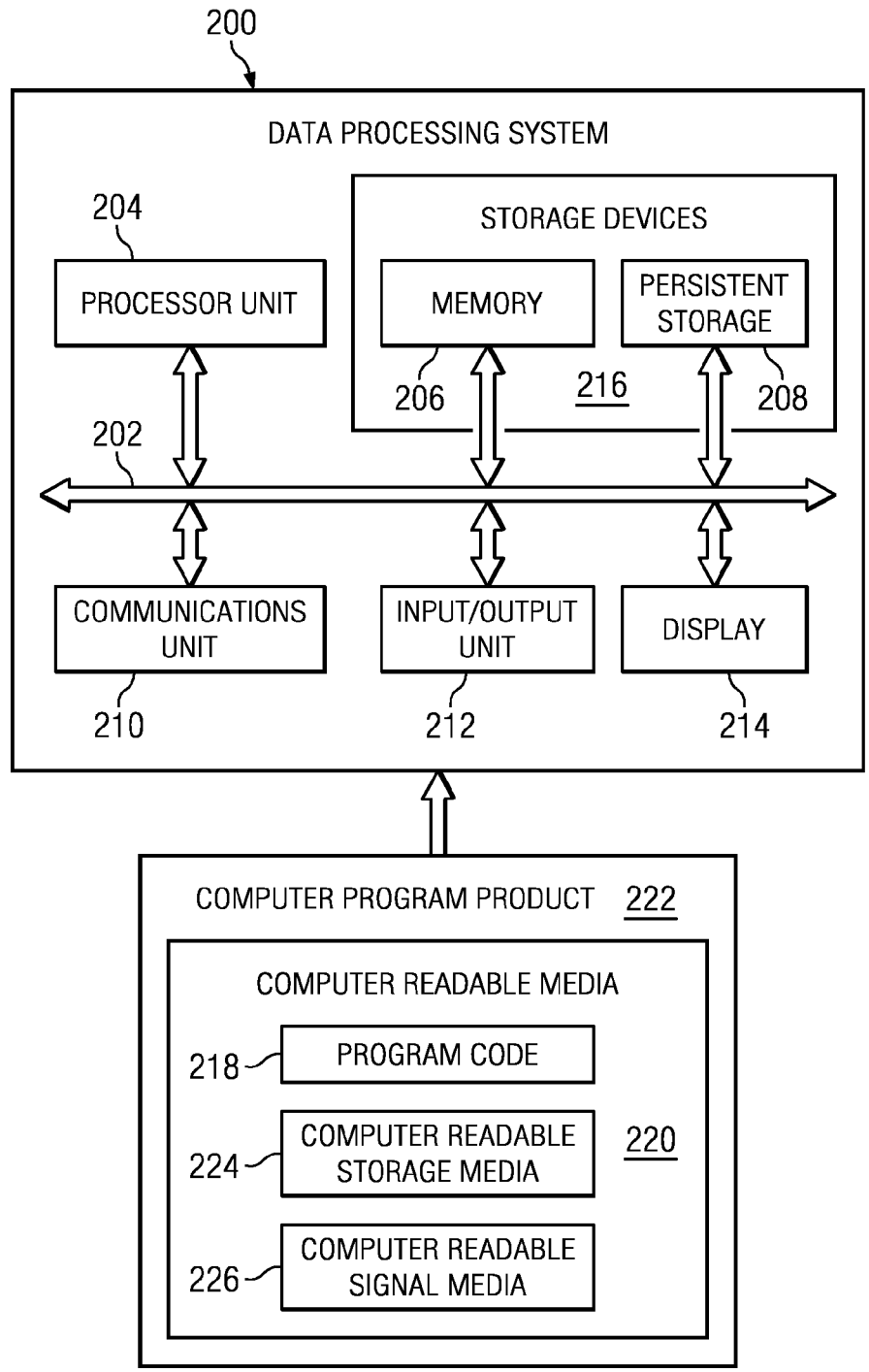
FIG. 2 is an illustration of a data processing system depicted in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 404 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The illustrative embodiments described herein provide a computer implemented method for verifying code within an integrated development environment. A first data processing system identifies a code dependency within a first artifact located thereon. The code dependency depends on the second artifact. Responsive to identifying the dependency within the first artifact, the first data processing system identifies a second data processing system within a network that contains the second artifact. The first data processing system requests permission from the second data processing system to access the second artifact. Responsive to receiving permission to access the second artifact, the first data processing system accesses the second artifact on the second data processing system. The first data processing system then verifies a compatibility of the second artifact with the code dependency within the first artifact.

Figure 3:
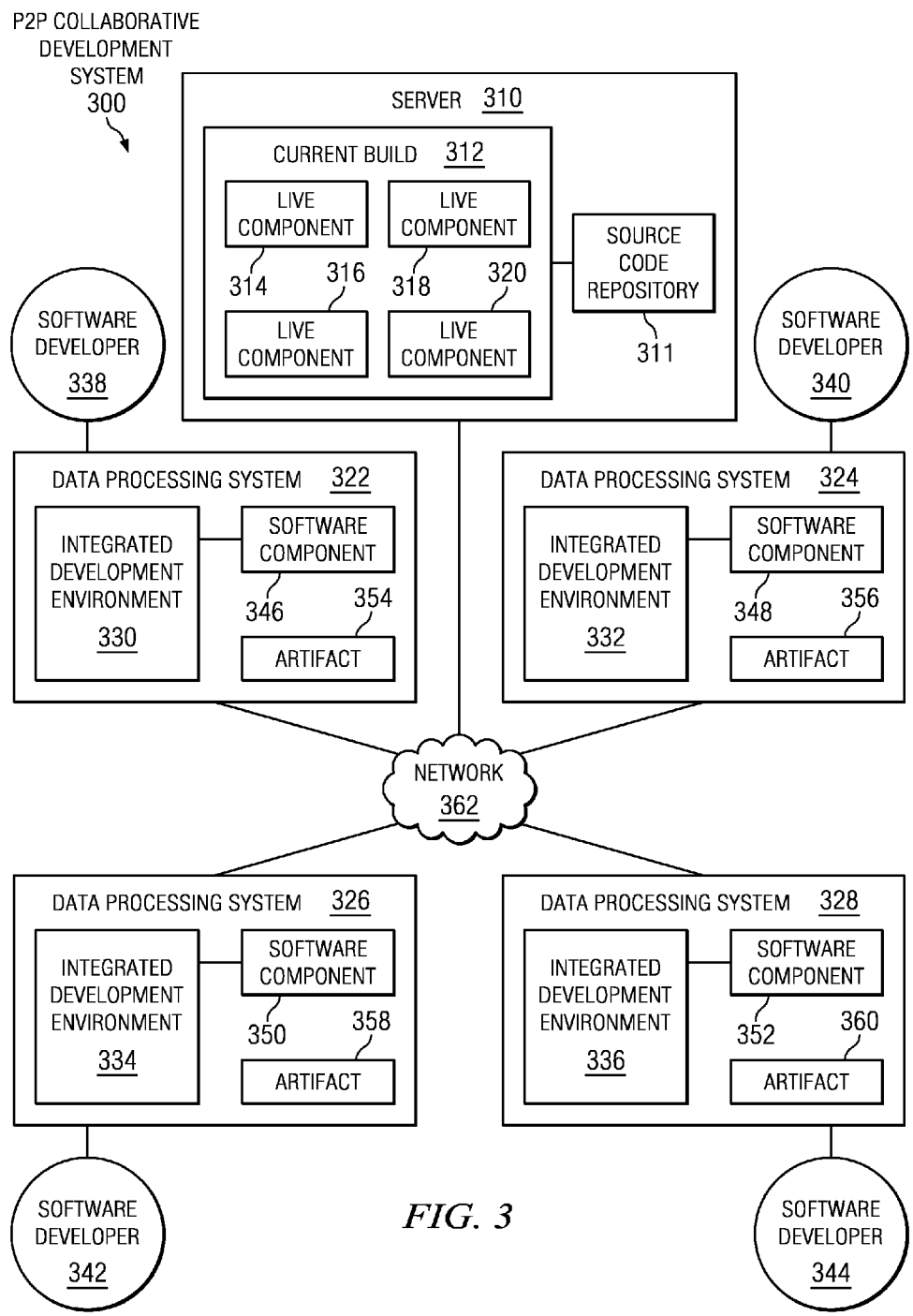
FIG. 3 is a peer-to-peer (P2P) collaborative development system according to an illustrative embodiment.

Referring now to FIG. 3, a peer-to-peer (P2P) collaborative development system is shown, according to an illustrative embodiment. P2P collaborative development system 300 can be implemented as a virtual topology superimposed on the existing network infrastructure, such as network data processing system 100 of FIG. 1. P2P collaborative development system 300 is a peer-to-peer overlay network in which all participants (always at edge of Internet) have identical responsibilities, and organize them into a network in an ad hoc manner.

Server 310 is a server such as server computer 104 or server computer 106 of FIG. 1. Server 310 contains current build 312. Current build 312 is a software application resulting from the compilation of several software artifacts that are themselves compiled from separate software components.

Server 310 includes source code repository 311. Source code repository 311 is a storage device where large amounts of source code are kept, either publicly or privately. They are often used by multi-developer projects to handle various versions and developers submitting various patches of code in an organized fashion. Source code repository 311 can be, for example, but not limited to, memory 206, persistent storage 208, and computer readable media 220 of FIG. 2.

Current build 312 is compiled from live components, such as live components 314-320. Each of live components 314-320 is a piece of software designed to work as a component of a larger and generally more complex application, such as current build 312.

Data processing systems 322-328 are data processing systems such as one of server computers 104, and 106, or client computers 110, 112, and 114 of FIG. 1. Each of data processing systems 322-328 executes an integrated development environment, such as one of integrated development environments 330-336. Each of integrated development environments 330-336 is a software application that provides comprehensive facilities to software developers 338-344 for development of software components 346-352. Integrated development environments 330-336 may consist of, for example, but not limited to, a source code editor, a compiler, an interpreter, build automation tools, and a debugger. Software developers 338-344 utilize respective ones of integrated development environments 330-336 to create and make changes to software components 346-352.

Software components 346-352 are individual components of a software build that have not been incorporated into current build 312. In a collaborative software development environment, such as P2P collaborative development system 300, each of software developers 338-344 is responsible for building specific components of the overall build. For example, in P2P collaborative development system 300, software developer 338 is responsible for software component 346. Software developer 340 is responsible for software component 348. Software developer 342 is responsible for software component 350. Software developer 344 is responsible for software component 352. Software developers 338-344 utilize respective ones of integrated development environments 330-336 to create and make changes to software components 346-352.

When software components 346-352 are finalized by software developers 338-344, software components 346-352 are incorporated into current build 312. Once compiled into current build 312, software components 346-352 become live components 314-320. In that sense, prior to compilation into current build 312, each of live components 314-320 was previously one of software components 346-352. Therefore, live components 314-320 are earlier iterations of software components 346-352.

Prior to compiling software components 346-352 into current build 312, each of software developers 338-344 independently confirms the stability, operability, and dependencies of software components 346-352. In order to confirm software components 346-352, software developers 338-344 utilize integrated development environments 330-336 in order to create artifacts 354-360. Each of artifacts 354-360 is a compiled version of a corresponding one of software components 346-352. That is, artifact 354 is a compiled version of software component 346, but does not include code, compiled or otherwise, for software components 348-352. Artifact 356 is a compiled version of software component 348, but does not include code, compiled or otherwise, for software components 346, and 350-352. Artifact 358 is a compiled version of software component 350, but does not include code, compiled or otherwise, for software components 346-348, and 352. Artifact 360 is a compiled version of software component 352, but does not include code, compiled or otherwise, for software components 346-350.

In one illustrative embodiment, ones of artifacts 354-360 may have code dependencies that require data from others of artifacts 354-360. A code dependency is a section of code that requires data or input from another section of code in order to finish a dependent task or process. An artifact, such as ones of artifacts 354-360, having a code dependency is able to access other ones of artifacts 354-360 across network 362 in order to verify the dependency of the dependent artifact with the other ones of artifacts 354-360.

An integrated development environment executing an artifact having dependencies, such as one of integrated development environments 330-336, does not pull or download other artifacts or software components into its own development environment. Rather, one integrated development environment, such as one of integrated development environments 330-336, will communicate with others of integrated development environment 330-336, and resolve any constraints of the dependent code without transferring the actual artifacts or software components between the separate integrated development environments.

While code dependencies between components are typically more common, the illustrative embodiments can be used to resolve other dependencies of the artifacts as well. For example, an artifact, such as ones of artifacts 354-360 may have dependencies not only on code, but also on actual integrated development environment settings in the other peer-to-peer node machine, such as the settings of one of integrated development environments 330-336.

For example, a software developer 338 is unit testing the code and cannot reproduce the problem identified by software developer 340. Software developer 338 therefore wants to make sure that integrated development environments 330 is set up in exactly the same way as integrated development environments 332 of software developer 340. In this scenario, integrated development environments 330 communicates with integrated development environments 332 to pull integrated development environment settings from integrated development environments 330 to integrated development environments 332.

Figure 4:
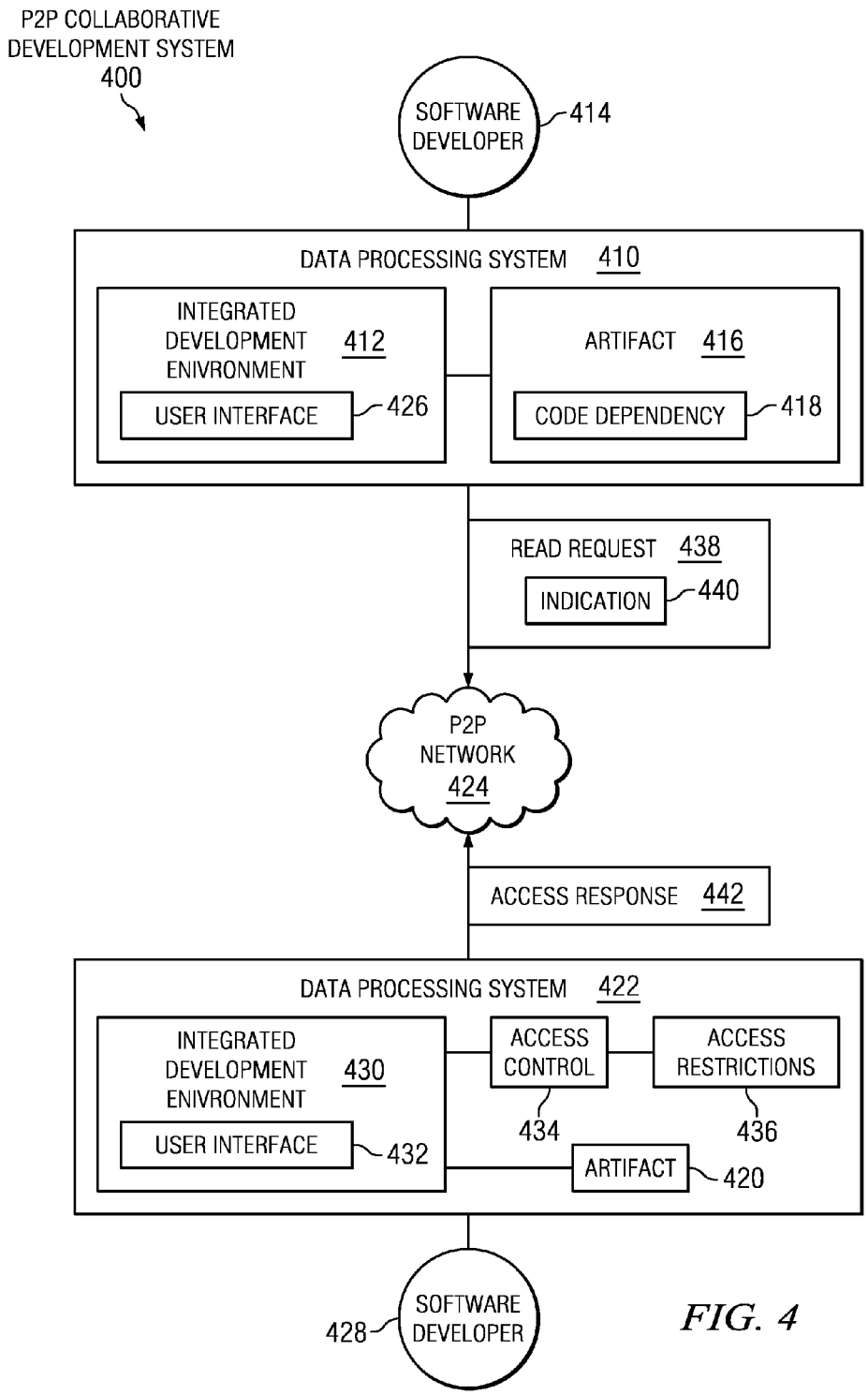
FIG. 4 is a data flow for testing software components within a peer-to-peer (P2P) collaborative development system according to an illustrative embodiment.

Referring now to FIG. 4, a data flow for testing software components within a peer-to-peer (P2P) collaborative development system is shown, according to an illustrative embodiment. P2P collaborative development system 400 can be, for example, P2P collaborative development system 300 of FIG. 3.

Data processing system 410 is a data processing system such as one of data processing systems 322-328 of FIG. 3. Data processing system 410 executes integrated development environment 412. Integrated development environment 412 is an integrated development environment such as one of integrated development environments 330-336 of FIG. 3.

Software developer 414 uses integrated development environment 412 to create artifact 416. Artifact 416 is an artifact such as one of artifacts 354-360. Artifact 416 contains code dependency 418. Code dependency 418 is a section of code that requires data or input from another section of code in order to finish a dependent task or process. Code dependency 418 depends on artifact 416 in order to finish a task or process of artifact 416.

Artifact 420 is located on data processing system 422. Artifact 420 is an artifact such as one of artifacts 354-360. Data processing system 422 is a data processing system such as one of data processing systems 322-328 of FIG. 3. Code dependency 418 of artifact 416 depends on artifact 420 in order to finish a task or process of artifact 416.

Integrated development environment 412 identifies that code dependency 418 depends on artifact 420. Integrated development environment 412 therefore locates artifact 420 across P2P network 424, within P2P collaborative development system 400. Integrated development environment 412 does not identify every artifact or software components that are located across P2P network 424. Instead, integrated development environment 412 identifies which artifact or software components are dependencies of artifact 416. Integrated development environment 412 locates only those artifact or software components upon which artifact 416 depends.

Software developer 414 interacts with integrated development environment 412 through user interface 426. User interface 426 is a software component that allows software developer 414 to interact with integrated development environment 412.

Software developer 428 interacts with integrated development environment 430 of data processing system 422 through user interface 432. User interface 432 is a software component that allows software developer 414 to interact with integrated development environment 412. User interface 432 includes access control 434.

Access control 434 is a software component that controls what other software developers, data processing systems, artifacts, and software components may access artifacts located on data processing system 422, such as artifact 420. In one illustrative embodiment, access control 434 is implemented as a component of integrated development environment 430.

Access control 434 sets access restrictions 436. Access restrictions 436 is a data structure that contains permissions of what other software developers, data processing systems, artifacts, and software components may access artifacts located on data processing system 422, such as artifact 420.

Integrated development environment 412 locates artifact 420 required by code dependency 418. Integrated development environment 412 then sends read request 438 to integrated development environment 430 for access to artifact 420. Read request 438 includes indication 440. Indication 440 is an indication that at least one of integrated development environment 412, software developer 414, data processing system 410 is the source of read request 438. Indication 440 may also include, for example, data processing system classification information such as an indication of a development system, and an indication of a testing system. Indication 440 may also include, for example, user classification information such as an indication of a developer of artifact 416, a tester of artifact 416, and an owner of artifact 416. In response to receiving read request 438, integrated development environment 430 identifies whether one of integrated development environment 412, software developer 414, data processing system 410 has been granted read access of artifact 420. To identify whether one has been granted read access, integrated development environment 430 compares indication 440 of read request 438 to the permissions granted within access restrictions 436. If indication 440 of read request 438 matches one of the permissions within access restrictions 436, integrated development environment 430 grants integrated development environment 412 access to artifact 420.

In one illustrative embodiment, if indication 440 of read request 438 does not match one of the permissions within access restrictions 436, integrated development environment 430 does not immediately grant integrated development environment 412 access to artifact 420. Instead, integrated development environment 430 presents the access request to software developer 428. Software developer 428 can then decide whether access should be granted. If software developer 428 eventually allows access to artifact 420, integrated development environment 430 can then send access response 440 to integrated development environment 412, notifying that access to artifact 420 has been granted to integrated development environment 412.

Once integrated development environment 412 is granted access to artifact 420, integrated development environment 430 sends access response 442 to integrated development environment 412. Access response 442 informs integrated development environment 412 whether access has been granted to artifact 420. Integrated development environment 412 can verify the compatibility of code dependency 418 with artifact 420.

Figure 5:
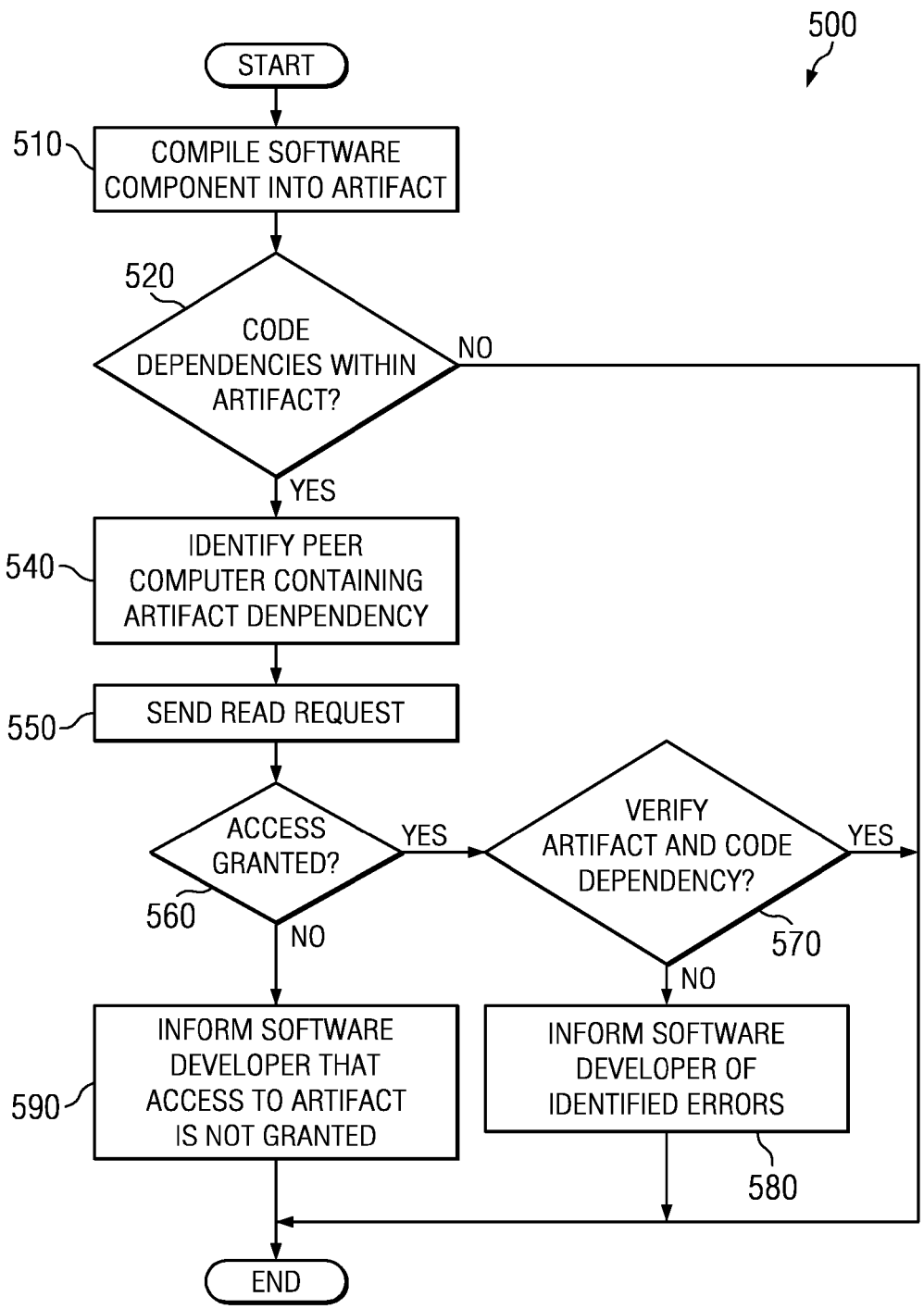
FIG. 5 is a flowchart illustrating the processing steps for accessing an dependency artifact within a P2P collaborative development system according to an illustrative embodiment.

Referring now to FIG. 5, a flowchart illustrating the processing steps for accessing a dependency artifact within a P2P collaborative development system is shown according to an illustrative embodiment. Process 500 is a software process, executing on a software component, such as integrated development environment 412 of FIG. 4.

Process begins by identifying compiling a software component into an artifact (step 510). The software component can be, for example, one of software components 346-352 of FIG. 3.

Process 500 then identifies whether any code dependencies exist within the artifact (step 520). The code dependencies can be, for example, code dependency 418 of FIG. 4. If the artifact does not contain any code dependencies ("no" at step 520), the process terminates.

Returning now to step 520, responsive to determining that the process contains at least one code dependency ("yes" at step 520), process 520 identifies the peer computer containing the artifact depended upon (step 540). The peer computer can be, for example, data processing system 422 of FIG. 4.

Responsive to identifying the peer computer containing the artifact depended upon, process 500 sends a read request to the peer computer (step 550). The read request can be, for example, read request 438 of FIG. 4. The read request contains an indication as to the source of the request, such as indication 440 of FIG. 4.

Process 500 then determines whether access to the artifact depended upon is granted by the peer computer (step 560). Responsive to determining that access to the artifact depended upon is granted by the peer computer ("yes" at step 560), process 500 verify the artifact and its compatibility of code dependency with the artifact depended upon (step 570).

Once the artifact and any code dependencies therein have been verified ("yes" at step 570), process 500 terminates.

Returning now to step 570, responsive to the artifact and any code dependencies therein not being verified ("no" at step 570), process 500 informs a software developer of any identified errors within the software component or the artifact (step 580), with the process terminating thereafter. The software developer can then use the identified errors to make changes to software component or the artifact prior to forwarding the software component for compilation into a current build as a live component.

Returning now to step 560, responsive to determining that access to the artifact depended upon is not granted by the peer computer ("no" at step 560), process 500 informs the software developer that access to the requested artifact has not been granted (step 590). Process 500 terminates thereafter.

Figure 6:
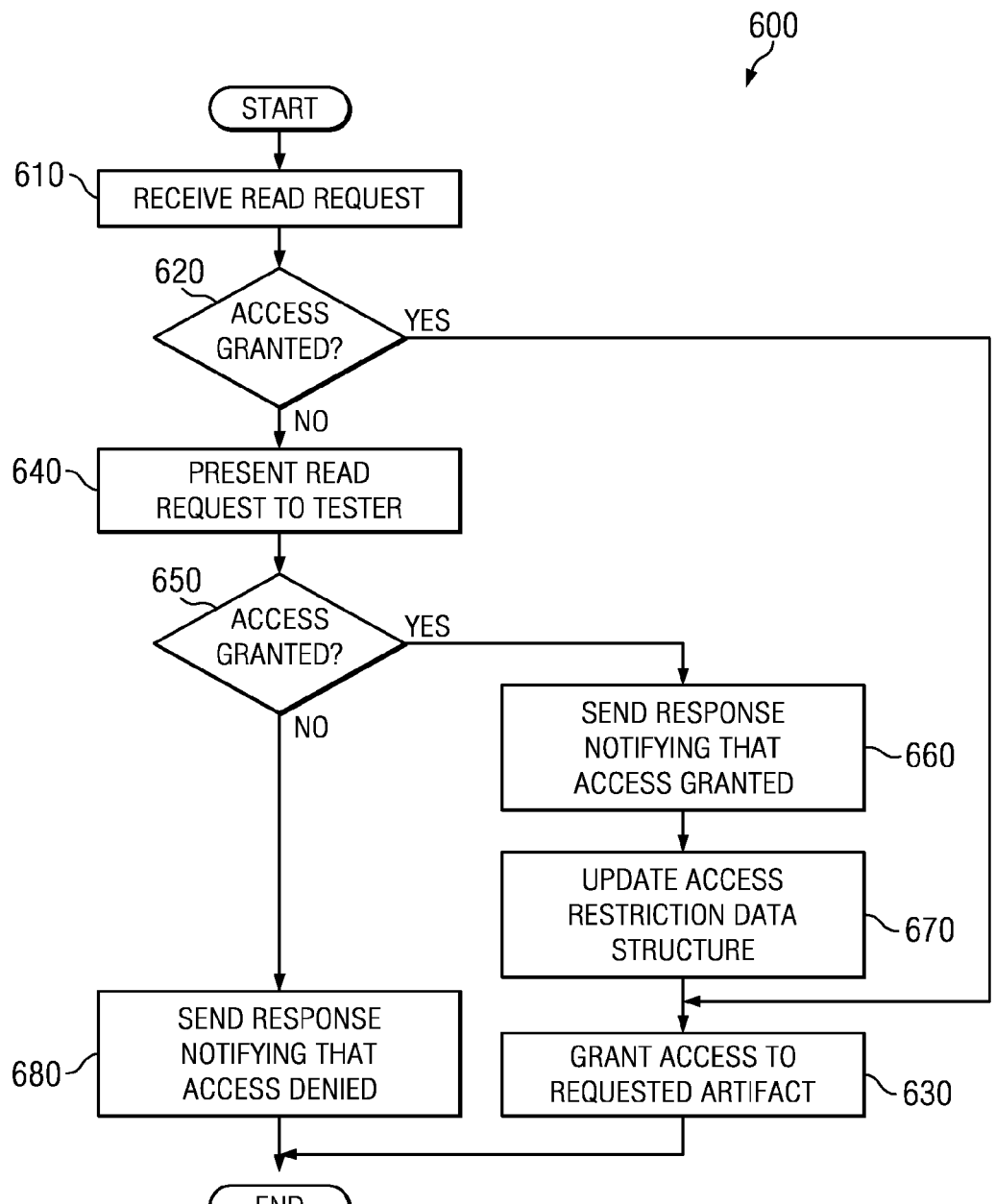
FIG. 6 is a process for granting access to software components and artifacts within a P2P collaborative development system according to an illustrative embodiment.

Referring now to FIG. 6, a process for granting access to software components and artifacts within a P2P collaborative development system is shown according to an illustrative embodiment. Process 600 is a software process, executing on a software component, such as integrated development environment 430 of FIG. 4.

Process 600 begins by receiving a read request from an integrated development environment (step 610). The read request can be, for example, read request 438 of FIG. 4. The integrated development environment can be, for example, integrated development environment 412 of FIG. 4. The read request contains an indication as to the source of the request, such as indication 440 of FIG. 4.

Responsive to receiving the read request, process 600 identifies whether access has been granted to a requested artifact (step 620). The indication may indicate at least one of an integrated development environment, a software developer, and a data processing system. To identify whether one has been granted read access, process 600 compares the indication of the read request to the permissions granted within access restriction data structure, such as for example access restrictions 436 of FIG. 4.

If the indication of the read request matches one of the permissions within the access restrictions data structure ("yes" at step 620), process 600 grants the requesting integrated development environment access to the requested artifact (step 630), with the process terminating thereafter.

However, if the indication of the read request does not match one of the permissions within the access restrictions data structure ("no" at step 620), process 600 presents the read request to a software developer (step 640). The software developer can be, for example, software developer 428 of FIG. 4. Process 400 then polls for a response from the software developer to determine whether access to the requested artifact is allowed (step 650). The software developer can then decide whether access should be granted.

Responsive to receiving notice that the software developer grants access to artifact ("yes" at step 650), process can send an access response to requesting integrated development environment, notifying that access to artifact has been granted (step 660). Process 600 then updates the access restrictions data structure to indicate that access has been granted to the requested artifact (step 670). The access restrictions data structure can be updated to include an indication of at least one of the integrated development environment, a software developer, and a data processing system that has been granted access, as well as the specific artifact or test code that access has been granted to. Process 600 then grants the requesting integrated development environment access to the requested artifact (step 630), with the process terminating thereafter.

Returning now to step 650, responsive to receiving notice that the software developer does not grant access to artifact ("no" at step 650), process can send an access response to requesting integrated development environment, notifying that access to artifact has not been granted (step 680). Process 600 terminates thereafter.

Thus, the illustrative embodiments described herein provide a computer implemented method for verifying code within an integrated development environment. A first data processing system identifies a code dependency within a first artifact located thereon. The code dependency depends on the second artifact. Responsive to identifying the dependency within the first artifact, the first data processing system identifies a second data processing system within a network that contains the second artifact. The first data processing system requests permission from the second data processing system to access the second artifact. Responsive to receiving permission to access the second artifact, the first data processing system accesses the second artifact on the second data processing system. The first data processing system then verifies a compatibility of the second artifact with the code dependency within the first artifact.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for verifying code within an integrated development environment, the method comprising the computer implemented steps of:

identifying, by a first data processing system executing a first integrated development environment, at least one code dependency within a first artifact, the first artifact being located by the first integrated development environment on the first data processing system;

responsive to identifying the at least one code dependency within the first artifact, identifying, by the first data processing system, a second data processing system executing a second integrated development environment within a network that contains a second artifact to which access is controlled by the second integrated development environment, wherein the at least one code dependency depends on the second artifact;

responsive to identifying the second data processing system within the network that contains the second artifact, sending a read request to the second integrated development environment on the second data processing system requesting permission by the first data processing system to access the second artifact on the second data processing system, wherein the read request includes information comprising an indication that at least one of the first integrated development environment, a software developer, and the first data processing system is a source of the read request, the information further comprising data processing system classification information including an indication of a development system, and an indication of a testing system and user classification information further including an indication of a developer of the first artifact, a tester of the first artifact, and an owner of the first artifact;

responsive to requesting permission to access the second artifact, receiving permission, by the first data processing system, for the first data processing system to have read access to the second artifact to which access is controlled by the second integrated development environment on the second data processing system;

responsive to receiving permission to have the read access to the second artifact, accessing, by the first data processing system, to read the second artifact on the second data processing system, for use in peer to peer sharing by the first integrated development environment of the first data processing system wherein the second artifact remains on the second data processing system; and responsive to accessing by the first data processing system, to read the second artifact on the second data processing system, verifying, by the first integrated development environment on the first data processing system, a compatibility of the second artifact with the at least one code dependency within the first artifact.

2. The computer implemented method of claim 1, wherein the step of identifying the second data processing system within the network that contains the second artifact further comprises:

responsive to identifying the at least one code dependency within the first artifact, identifying the second data processing system within the network that contains the second artifact, wherein the network is a peer-to-peer network, wherein the at least one code dependency depends on the second artifact.

3. The computer implemented method of claim 2, wherein the second data processing system further comprises:

a peer data processing system within the peer-to-peer network, the second data processing system comprising an access control that controls whether the first artifact can access the second artifact.

4. The computer implemented method of claim 3, wherein the access control further comprises an access restriction data structure containing a set of permissions for what other software developers, other data processing systems, other artifacts, and other software components may access the second artifact on the second data processing system.

5. The computer implemented method of claim 4, wherein responsive to receiving a permission request from the first data processing system to have the read access to the second artifact, the second data processing system determines whether the first data processing system has permission to have the read access to the second artifact, wherein the second data processing system determines that the first data processing system has permission to have the read access to the second artifact by matching information within the permission request to information within the access restriction data structure.

6. The computer implemented method of claim 5, wherein responsive to determining that the first data processing system has permission to have the read access to the second artifact by matching the information within the permission request to the information within the access restriction data structure, the second data processing system sends an access response to the first data processing system, the access response indicating that the first data processing system has permission to have the read access to the second artifact.

7. The computer implemented method of claim 5, wherein responsive to determining that the first data processing system does not have permission to have the read access to the second artifact by the information within the permission request not matching the information within the access restriction data structure, the second data processing system sends an access response to the first data processing system, the access response indicating that the first data processing system does not have permission to have the read access to the second artifact, and the second data processing system presents the permission request to a software developer for determination of whether the first data processing system should be granted the read access to the second artifact.

8. A non-transitory computer readable storage medium having a computer program product encoded thereon for verifying code within an integrated development environment, the computer program product comprising:
  instructions for identifying at least one code dependency within a first artifact, the first artifact being located by a first integrated development environment on a first data processing system;
  instructions, responsive to identifying the at least one code dependency within the first artifact, for identifying a second data processing system within a network that contains a second artifact to which access is controlled by a second integrated development environment, wherein the at least one code dependency depends on the second artifact;
  instructions, responsive to identifying the second data processing system within the network that contains the second artifact, for sending a read request to the second integrated development environment on the second data processing system requesting permission for the first data processing system to access the second artifact on the second data processing system, wherein the read request includes information comprising an indication that at least one of the first integrated development environment, a software developer, and the first data processing system is a source of the read request, the information further comprising data processing system classification information including an indication of a development system, and an indication of a testing system and user classification information further including an indication of a developer of the first artifact, a tester of the first artifact, and an owner of the first artifact;
  instructions, responsive to requesting permission to access the second artifact, for receiving permission for the first data processing system to have read access to the second artifact to which access is controlled by the second integrated development environment on the second data processing system;
  instructions, responsive to receiving permission to have read access to the second artifact, for accessing by the first data processing system, to read the second artifact on the second data processing system, for use in peer to peer sharing by the first integrated development environment of the first data processing system wherein the second artifact remains on the second data processing system; and
  instructions, responsive to accessing by the first data processing system, to read the second artifact on the second data processing system, for verifying a compatibility of the second artifact with the at least one code dependency within the first artifact.

9. The non-transitory computer readable storage medium of claim 8, wherein the instructions for identifying the second data processing system within the network that contains the second artifact further comprises:
  instructions, responsive to identifying the at least one code dependency within the first artifact, for identifying the second data processing system within the network that contains the second artifact, wherein the network is a peer-to-peer network, wherein the at least one code dependency depends on the second artifact.

10. The non-transitory computer readable storage medium of claim 9, wherein the second data processing system further comprises:
  a peer data processing system within the peer-to-peer network, the second data processing system comprising an access control that controls whether the first artifact can access the first artifact can access the second artifact.

11. The non-transitory computer readable storage medium of claim 10, wherein the access control further comprises an access restriction data structure containing a set of permissions for what other software developers, other data processing systems, other artifacts, and other software components may access the second artifact on the second data processing system.

12. The non-transitory computer readable storage medium of claim 11, wherein the computer program product further comprises instructions, responsive to receiving a permission request from the first data processing system to have the read access to the second artifact, for determining by the second data processing system whether the first data processing system has permission to have the read access to the second artifact, wherein the instructions for determining that the first data processing system has permission to have the read access to the second artifact by matching information within the permission request to information within the access restriction data structure.

13. The non-transitory computer readable storage medium of claim 12, wherein the computer program product further comprises instructions, responsive to determining that the first data processing system has permission to have the read access to the second artifact by matching the information within the permission request to the information within the access restriction data structure, for sending an access response from the second data processing system to the first data processing system, the access response indicating that the first data processing system has permission to have the read access to the second artifact.

14. The non-transitory computer readable storage medium of claim 12, wherein the computer program product further comprises instructions, responsive to determining that the first data processing system does not have permission to have the read access to the second artifact by the information within the permission request not matching the information within the access restriction data structure, for sending an access response from the second data processing system to the first data processing system, the access response indicating that the first data processing system does not have permission to have the read access to the second artifact, and the second data processing system presents the permission request to a software developer for determination of whether the first data processing system should be granted the read access to the second artifact.

15. A data processing system comprising:
a computer usable storage medium having a computer program product encoded thereon for verifying code within an integrated development environment;
a bus system connecting the computer usable storage medium to a processor; and
a processor, wherein the processor executes the computer program product:
to identify at least one code dependency within a first artifact, the first artifact being located by a first integrated development environment on a first data processing system;
responsive to identifying the at least one code dependency within the first artifact, to identify a second data processing system within a network that contains a second artifact to which access is controlled by a second integrated development environment, wherein the at least one code dependency depends on the second artifact;
responsive to identifying the second data processing system within the network that contains the second artifact, to send a read request to the second integrated development environment on the second data processing system to request permission for the first data processing system to access the second artifact to which access is controlled by the second integrated development environment on the second data processing system, wherein the read request includes information comprising an indication that at least one of the first integrated development environment, a software developer, and the first data processing system is a source of the read request, the information further comprising data processing system classification information including an indication of a development system, and an indication of a testing system and user classification information further including an indication of a developer of the first artifact, a tester of the first artifact, and an owner of the first artifact;
responsive to requesting permission to access the second artifact, to receive permission for the first data processing system to have read access to the second artifact to which access is controlled by the second integrated development environment on the second data processing system;
responsive to receiving permission to have the read access to the second artifact, to access by the first data processing system, to read the second artifact on the second data processing system, for use in peer to peer sharing by the first integrated development environment of the first data processing system wherein the second artifact remains on the second data processing system as a single instance within the network; and responsive to accessing by the first data processing system, to read the second artifact on the second data processing system, to verify a compatibility of the second artifact with the at least one code dependency within the first artifact.

16. The data processing system of claim 15, wherein the processor executing the computer program product to identify the second data processing system within the network that contains the second artifact further comprises:
the processor executing the computer program product, responsive to identifying the at least one code dependency within the first artifact, to identify the second data processing system within the network that contains the second artifact, wherein the network is a peer-to-peer network, wherein the at least one code dependency depends on the second artifact.

17. The data processing system of claim 16, wherein the second data processing system further comprises:
a peer data processing system within the peer-to-peer network, the second data processing system comprising an access control that controls whether the first artifact can access the second artifact.

18. The data processing system of claim 17, wherein the access control further comprises an access restriction data structure containing a set of permissions for what other software developers, other data processing systems, other artifacts, and other software components may access the second artifact on the second data processing system.

19. The data processing system of claim 18, wherein a second processor on the second data processing machine executes a second computer program product, responsive to receiving a permission request from the first data processing system to have the read access to the second artifact, to determine by the second data processing system whether the first data processing system has permission to have the read access to the second artifact, wherein the second data processing system determines that the first data processing system has permission to have the read access to the second artifact by matching information within the permission request to information within the access restriction data structure.

20. The data processing system of claim 19, wherein the second processor on the second data processing machine executes the second computer program product, responsive to determining that the first data processing system has permission to have the read access to the second artifact by matching the information within the permission request to the information within the access restriction data structure, to send an access response from the second data processing system to the first data processing system, the access response indicating that the first data processing system has permission to have the read access to the second artifact.

21. The data processing system of claim 20, wherein the second processor on the second data processing machine executes the second computer program product, responsive to determining that the first data processing system does not have permission to have the read access to the second artifact by the information within the permission request not matching the information within the access restriction data structure, to send an access response from the second data processing system to the first data processing system, the access response indicating that the first data processing system does not have permission to have the read access to the second artifact, and the second data processing system presents the permission request to a software developer for determination of whether the first data processing system should be granted the read access to the second artifact.

22. The computer implemented method of claim 1 further comprising:
- responsive to identifying the at least one code dependency within the first artifact, identifying, by the first data processing system, a second data processing system executing a second integrated development environment within a network that contains a second artifact to which access is controlled by the second integrated development environment, wherein the at least one code dependency depends on the second artifact;
- responsive to identifying by the first data processing system, the second data processing system executing the second integrated development environment within the network that contains the second artifact, pulling a plurality of integrated development environment settings from the second integrated development environment on the second data processing system to the first integrated development environment; and
- responsive to pulling the plurality of integrated development environment settings, reconfiguring, by the first data processing system, the first integrated development environment to be identical to the second integrated development environment;
- wherein the verifying compatibility of the second artifact with the at least one code dependency within the first artifact is further performed responsive to the reconfiguring the first integrated development environment.

23. The non-transitory computer readable storage medium of claim 8, wherein the computer program product further comprises:
- instructions responsive to identifying the at least one code dependency within the first artifact, for identifying, by the first data processing system, a second data processing system executing a second integrated development environment within a network that contains a second artifact to which access is controlled by the second integrated development environment, wherein the at least one code dependency depends on the second artifact;
- instructions, responsive to by the first data processing system, the second data processing system executing the second integrated development environment within the network that contains the second artifact, for pulling a plurality integrated development environment settings from the second integrated development environment on the second data processing system to the first integrated development environment; and
- instructions, responsive to pulling the plurality of integrated development environment settings, for reconfiguring, by the first data processing system, the first integrated development environment to be identical to the second integrated development environment;
- wherein the instructions for verifying compatibility of the second artifact with the at least one code dependency within the first artifact are further performed responsive to the reconfiguring of the first integrated development environment.

24. The data processing system of claim 15, wherein the processor further executes the computer program product:
- responsive to identifying the at least one code dependency within the first artifact, to identify, by the first data processing system, a second data processing system executing a second integrated development environment within a network that contains a second artifact to which access is controlled by the second integrated development environment, wherein the at least one code dependency depends on the second artifact;
- responsive to identifying by the first data processing system, the second data processing system executing the second integrated development environment within the network that contains the second artifact, to pull a plurality of integrated development environment settings from the second integrated development environment on the second data processing system to the first integrated development environment; and
- responsive to pulling the plurality of the integrated development environment settings, to reconfigure, by the first data processing system, the first integrated development environment to be identical to the second integrated development environment;
- wherein the processor further executes the computer program product verify compatibility of the second artifact with the at least one code dependency within the first artifact responsive to the reconfiguring the first integrated development environment.

* * * * *